United States Patent
Deng et al.

(10) Patent No.: US 11,195,017 B2
(45) Date of Patent: Dec. 7, 2021

(54) IMAGE ACQUISITION DEVICE, GOODS SHELF, MONITORING METHOD AND DEVICE FOR GOODS SHELF, AND IMAGE RECOGNITION METHOD

(71) Applicant: BOE TECHNOLOGY GROUP CO., LTD., Beijing (CN)

(72) Inventors: Wei Deng, Beijing (CN); Huawei Yu, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 280 days.

(21) Appl. No.: 16/425,086

(22) Filed: May 29, 2019

(65) Prior Publication Data

US 2020/0019783 A1   Jan. 16, 2020

(30) Foreign Application Priority Data

Jul. 10, 2018   (CN) .......................... 201810754763.3

(51) Int. Cl.
*G06K 9/00*       (2006.01)
*H04W 4/35*       (2018.01)
(Continued)

(52) U.S. Cl.
CPC ........ *G06K 9/00671* (2013.01); *A47F 5/0043* (2013.01); *G02B 13/06* (2013.01); *H04W 4/35* (2018.02)

(58) Field of Classification Search
CPC .... G06Q 10/087; G06Q 10/08; G06Q 20/203; G06T 2207/30232; G02B 13/06;
(Continued)

(56) References Cited

U.S. PATENT DOCUMENTS 5,790,181 A * 8/1998 Chahl .............. G08B 13/19626
                                                      348/36
6,226,035 B1 * 5/2001 Korein ................... G02B 13/06
                                                     348/335
(Continued)

FOREIGN PATENT DOCUMENTS

CN      102592144 B      3/2014
CN      103714310 A      4/2014
(Continued)

OTHER PUBLICATIONS

Lei et al., Chinese Patent Publication CN106468666A, (Publication Date—Mar. 1, 2017), (Google English translation, pp. 1-7). (Year: 2017).*

(Continued)

*Primary Examiner* — Manav Seth
(74) *Attorney, Agent, or Firm* — Dilworth & Barrese, LLP.; Michael J. Musella, Esq.

(57) ABSTRACT

An image acquisition device, a goods shelf, a monitoring device for a goods shelf, a monitoring method for a goods shelf and an image recognition method are disclosed. The image acquisition device includes at least one reflective part which is configured to form a virtual image of an object through reflection of the object; and a camera which is configured to take a picture of the object and the virtual image of the object, so as to reduce a photograph blind zone.

20 Claims, 4 Drawing Sheets

(51) Int. Cl.
*A47F 5/00* (2006.01)
*G02B 13/06* (2006.01)

(58) Field of Classification Search
CPC ........ G06K 9/78; G06K 9/46; G06K 9/00671; G06K 9/00771; G06K 9/00281; G01N 2035/0493; G01N 35/00732; A47F 5/0043; H04W 4/35
See application file for complete search history.

(56) References Cited

U.S. PATENT DOCUMENTS

| | | | | |
|---|---|---|---|---|
| 6,594,539 | B1* | 7/2003 | Geng | A61B 1/247 |
| | | | | 264/16 |
| 6,599,247 | B1* | 7/2003 | Stetten | A61B 8/00 |
| | | | | 128/916 |
| 7,559,895 | B2* | 7/2009 | Stetten | A61B 17/3403 |
| | | | | 600/443 |
| 8,189,855 | B2* | 5/2012 | Opalach | G06K 9/00201 |
| | | | | 382/100 |
| 8,336,720 | B2* | 12/2012 | Potter | A47F 11/04 |
| | | | | 211/74 |
| 8,692,738 | B2* | 4/2014 | Smithwick | G09G 3/003 |
| | | | | 345/6 |
| 9,120,621 | B1* | 9/2015 | Curlander | G06K 9/00771 |
| 9,508,115 | B2* | 11/2016 | Hamann | G06T 3/0043 |
| 9,536,167 | B2* | 1/2017 | Schwartz | G06K 9/00201 |
| 9,544,511 | B2* | 1/2017 | Hamann | H04N 5/33 |
| 9,740,937 | B2* | 8/2017 | Zhang | A61B 5/1128 |
| 9,904,883 | B2* | 2/2018 | Liston | G06Q 10/0833 |
| 9,996,818 | B1* | 6/2018 | Ren | G06F 16/5854 |
| 10,148,918 | B1* | 12/2018 | Seiger | G06Q 10/087 |
| 10,198,080 | B1* | 2/2019 | Worley, III | G02B 27/0093 |
| 10,347,066 | B2* | 7/2019 | Phillips | G07C 9/00912 |
| 10,521,646 | B2* | 12/2019 | Adato | G06F 16/288 |
| 10,699,421 | B1* | 6/2020 | Cherevatsky | H04N 7/181 |
| 10,743,683 | B2* | 8/2020 | Deng | A47F 10/02 |
| 10,880,489 | B2* | 12/2020 | Deng | H04N 5/23299 |
| 2002/0143672 | A1* | 10/2002 | Sawasaki | G06Q 10/087 |
| | | | | 705/29 |
| 2004/0135744 | A1* | 7/2004 | Bimber | G02B 27/017 |
| | | | | 345/32 |
| 2006/0023105 | A1* | 2/2006 | Kostrzewski | G06T 3/0018 |
| | | | | 348/335 |
| 2007/0069867 | A1* | 3/2007 | Fleisch | G06Q 10/087 |
| | | | | 340/309.16 |
| 2008/0027838 | A1* | 1/2008 | Sawasaki | G06Q 10/087 |
| | | | | 705/28 |
| 2008/0225131 | A1* | 9/2008 | Aoki | G06T 7/73 |
| | | | | 348/222.1 |
| 2008/0303904 | A1* | 12/2008 | Hsieh | B25H 3/02 |
| | | | | 348/159 |
| 2009/0052739 | A1* | 2/2009 | Takahashi | G06K 9/00771 |
| | | | | 382/103 |
| 2009/0060349 | A1* | 3/2009 | Linaker | G06K 9/00664 |
| | | | | 382/209 |
| 2011/0025503 | A1* | 2/2011 | Weaver | G08B 21/24 |
| | | | | 340/572.1 |
| 2011/0121699 | A1* | 5/2011 | Freimuth | B25H 3/028 |
| | | | | 312/237 |
| 2013/0036043 | A1* | 2/2013 | Faith | G06Q 30/0643 |
| | | | | 705/39 |
| 2015/0019391 | A1* | 1/2015 | Kumar | G06Q 10/087 |
| | | | | 705/28 |
| 2015/0029339 | A1* | 1/2015 | Kobres | H04N 7/181 |
| | | | | 348/150 |
| 2015/0379366 | A1* | 12/2015 | Nomura | G06Q 50/28 |
| | | | | 382/203 |
| 2019/0149725 | A1* | 5/2019 | Adato | H04N 1/32144 |
| | | | | 348/158 |
| 2020/0018603 | A1* | 1/2020 | Deng | G06K 9/00664 |

FOREIGN PATENT DOCUMENTS

| | | |
|---|---|---|
| CN | 204089981 U | 1/2015 |
| CN | 106468666 A | 3/2017 |
| CN | 106672859 A | 5/2017 |
| CN | 107454301 A | 12/2017 |
| EP | 2808831 A | 12/2014 |

OTHER PUBLICATIONS

Chinese Office Action dated Mar. 20, 2020.

* cited by examiner

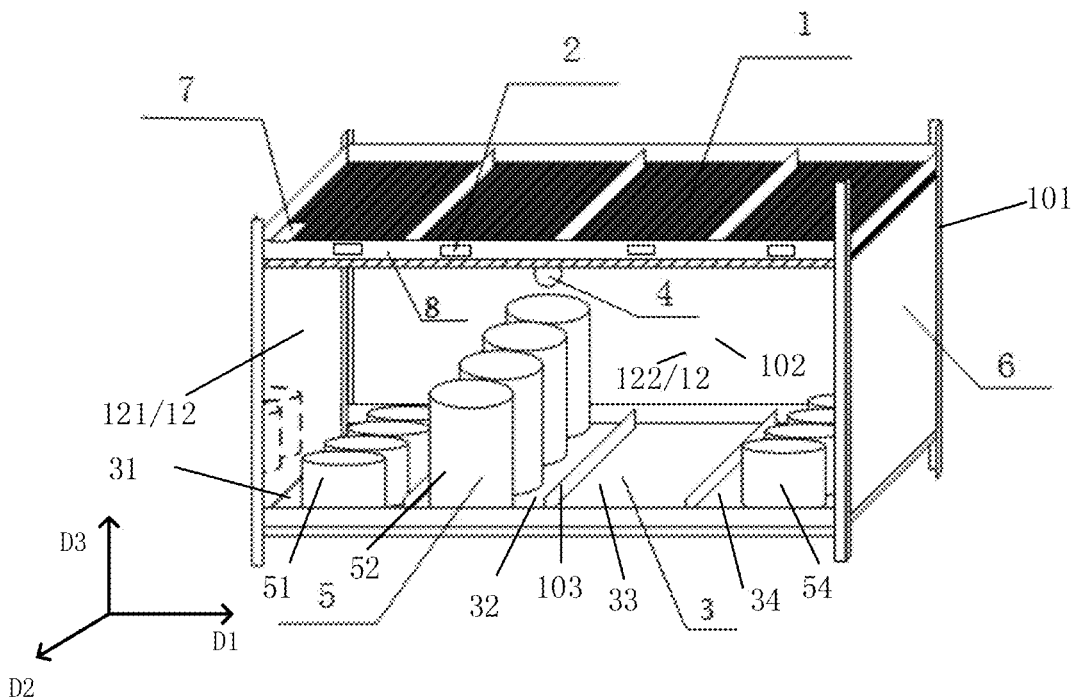

Fig. 2B

| |
|---|
| obtaining an image, which serves as an initial image, of the baseplate of the goods shelf that is empty through taking a picture — S101 |

| |
|---|
| obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects — S102 |

| |
|---|
| determining whether or not a blind zone exists according to the image of the virtual image and the image of the objects, and replacing a recognition region, which is corresponding to the blind zone, of the image of the objects with a recognition region, which is corresponding to the blind zone, of the image of the virtual image in a case where it is determined that the blind zone exists — S103 |

Fig. 3

```
┌─────────────────────────────────────────────────────────┐
│ performing image recognition with respect to objects    │
│ in the image of the objects and virtual objects, which  │
│ is corresponding to the objects in the image of the     │
│ objects, in the image of the virtual image,             │
│ respectively; and determining that the blind zone does  │──── S111
│ not exist in a case where the objects in the image of   │
│ the objects are same as the virtual objects, which is   │
│ corresponding to the objects in the image of the        │
│ objects, in the image of the virtual image              │
└─────────────────────────────────────────────────────────┘
                            │
                            ▼
┌─────────────────────────────────────────────────────────┐
│ determining that the blind zone exists in a case where  │──── S112
│ the objects in the image of the objects are not same as │
│ the virtual objects, which is corresponding to the      │
│ objects in the image of the objects, in the image of    │
│ the virtual image                                       │
└─────────────────────────────────────────────────────────┘
```

Fig. 4

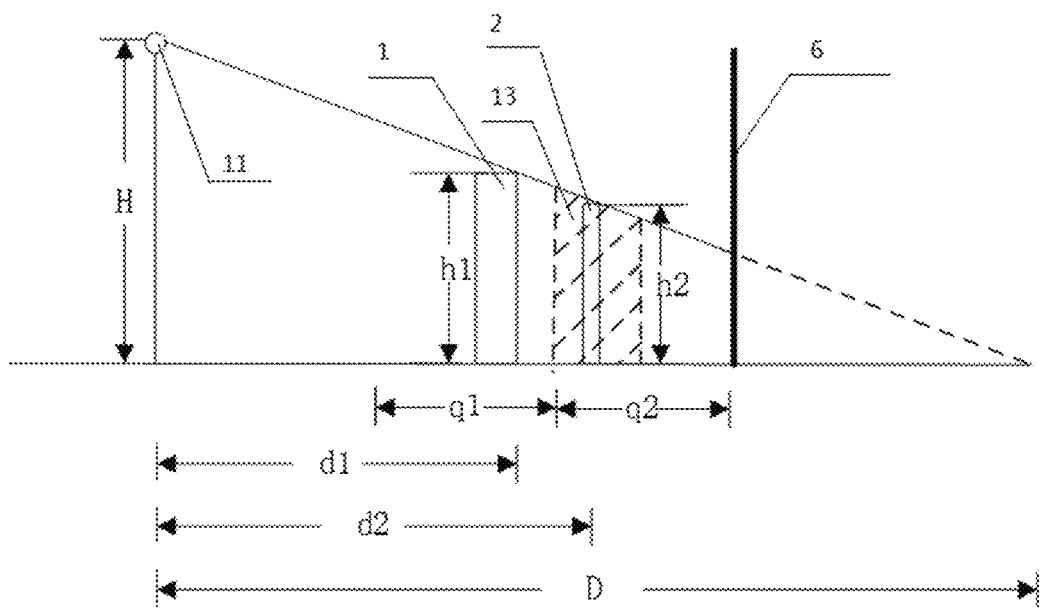

Fig. 5

IMAGE ACQUISITION DEVICE, GOODS SHELF, MONITORING METHOD AND DEVICE FOR GOODS SHELF, AND IMAGE RECOGNITION METHOD

CROSS REFERENCE TO RELATED APPLICATIONS

The application claims priority to Chinese patent application No. 201810754763.3, filed on Jul. 10, 2018, the entire disclosure of which is incorporated herein by reference as part of the present application.

TECHNICAL FIELD

Embodiments of the present disclosure relate to an image acquisition device, a goods shelf, a monitoring device for a goods shelf, a monitoring method for a goods shelf and an image recognition method.

BACKGROUND

Nowadays, self-service supermarkets make future retail modes receive an increasing amount of attention. In new retail modes, automatic detecting of commodity shortage and commodity misplacement through performing image recognition with respect to commodities on goods shelf is a solution with low cost.

SUMMARY

At least one embodiment of the present disclosure provides an image acquisition device, which comprises: at least one reflective part which is configured to form a virtual image of an object through reflection of the object; and a camera which is configured to take a picture of the object and the virtual image of the object, so as to reduce a photograph blind zone.

For example, in at least one example of the image acquisition device, the reflective part is at a side of the object away from the camera; and the reflective part is a plane mirror.

For example, in at least one example of the image acquisition device, the plane mirror is perpendicular to a plane where the object is placed; or the angle between the plane mirror and the plane where the object is placed is greater than 90 degrees or smaller than 90 degrees.

At least one embodiment of the present disclosure provides a goods shelf, which comprises a goods cabinet and an image acquisition device. The image acquisition device comprises at least one reflective part and a camera; the at least one reflective part is configured to form a virtual image of an object through reflection of the object; and the camera is configured to take a picture of the object and a virtual image of the object, so as to reduce a photograph blind zone; the goods cabinet comprises a baseplate; the baseplate is divided into a plurality of recognition regions, the plurality of recognition regions are respectively configured to support a plurality of kinds of objects; the camera of the image acquisition device is at a side of the plurality of kinds of objects away from the baseplate; and the at least one reflective part of the image acquisition device is at at least one side of the plurality of kinds of objects in a direction along which the plurality of recognition regions are arranged in parallel.

For example, in at least one example of the goods shelf, the plurality of recognition regions are arranged in parallel along a first direction; the at least one reflective part of the image acquisition device comprises a first reflective part, and the first reflective part is at one of the at least one side of the plurality of kinds of objects in the first direction.

For example, in at least one example of the goods shelf, the plurality of recognition regions is further arranged in parallel along a second direction which intersects the first direction; and the at least one reflective part of the image acquisition device further comprises a second reflective part, and the second reflective part is at another one of the at least one side of the plurality of kinds of objects in the second direction.

For example, in at least one example of the goods shelf, the goods cabinet further comprises a roof-plate and a side-plate; the side-plate is at at least one side of the plurality of recognition regions in the first direction; the plurality of recognition regions is arranged in parallel along a first direction; the camera of the image acquisition device is on a surface of the roof-plate closer to the baseplate; and the at least one reflective part of the image acquisition device is on a surface of the side-plate closer to the plurality of recognition regions.

For example, in at least one example of the goods shelf, the camera is at a centerline, which extends along a second direction intersecting the first direction, of the roof-plate.

For example, in at least one example of the goods shelf, the goods cabinet of the goods shelf further comprises a back plate; the back plate is at a side of the plurality of recognition regions in a second direction intersecting the first direction; the plurality of recognition regions is further arranged in parallel along the second direction; and the at least one reflective part is further on a surface of the back plate closer to the plurality of recognition regions.

At least one embodiment of the present disclosure provides a monitoring method for a goods shelf, which comprises: obtaining a determination result regarding whether or not an image of objects on the goods shelf comprises an occlusion area; obtaining the image of the objects and an image of a virtual image of the objects and performing image recognition based on the image of the objects and an image region, which is corresponding to the occlusion area, of the image of the virtual image in a case where the determination result is that the image of the objects comprises the occlusion area; and obtaining the image of the objects and performing image recognition based on the image of the objects in the case where the determination result is that the image of the objects does not comprise the occlusion area.

At least one embodiment of the present disclosure provides a monitoring device for a goods shelf, which comprises: a processor and a memory. Computer program instructions that are suitable to be executed by the processor are stored in the memory; upon the processor running the computer program instructions, the monitoring device for the goods shelf performs the monitoring method provided by any embodiment of the present disclosure.

For example, in at least one example of the monitoring device, upon the processor running the computer program instructions, the monitoring device for the goods shelf further performs a following method comprises: determining whether or not at least one of a group consisting of commodity shortage and commodity misplacement exists based on a result of the image recognition; and uploading at least one of a group consisting of information related to the commodity shortage and information related to the commodity misplacement to a server in a case where it is determined that the at least one of the group consisting of the commodity shortage and the commodity misplacement exists For example, in at least one example of the monitoring device, performing of the image recognition based on the image of the objects and the image region, which is corresponding to the occlusion area, of the image of the virtual image comprises: replacing the occlusion area with the image region, which is corresponding to the occlusion area, of the image of the virtual image, so as to obtain a processed image; and performing the image recognition based on the processed image.

For example, in at least one example of the monitoring device, upon the processor running the computer program instructions, the monitoring device for the goods shelf further performs a following method comprises: obtaining the occlusion area of the image of the objects.

For example, in at least one example of the monitoring device, the occlusion area is obtained through comparing the image of the objects and the image of the virtual image.

For example, in at least one example of the monitoring device, the occlusion area is an object number reduction area of the image of the objects; and a number of objects in the object number reduction area is smaller than a number of virtual objects in an image region, which is corresponding to the object number reduction area, of the image of the virtual image.

For example, in at least one example of the monitoring device, the occlusion area of the image of the objects is obtained based on lengths of the objects, a height of a camera of an image acquisition device of the goods shelf with respect to a plane where the objects are located, and a distance between adjacent objects; or the occlusion area comprises a recognition region at very outside of the plurality of recognition regions.

For example, in at least one example of the monitoring device, upon the processor running the computer program instructions, the monitoring device for the goods shelf further performs a following method comprises: obtaining the image of the objects and the image of the virtual image based on a picture which is taken by a camera of an image acquisition device of the goods shelf.

For example, in at least one example of the monitoring device, upon the processor running the computer program instructions, the monitoring device for the goods shelf further performs a following method comprises: dividing the image of the objects into a plurality of first image regions; dividing the image of the virtual image into a plurality of second image regions. The plurality of first image regions are respectively corresponding to a plurality of recognition regions of a baseplate of the goods shelf; and the plurality of second image regions are respectively corresponding to the plurality of recognition regions of the baseplate of the goods shelf.

At least one embodiment of the present disclosure provides an image recognition method based on the goods shelf provided by any one embodiment of the present disclosure, the image recognition method comprises: obtaining an image, which serves as an initial image, of the baseplate of the goods shelf that is empty; obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects; and determining whether or not a blind zone exists according to the image of the virtual image and the image of the objects, and replacing a recognition region, which is corresponding to the blind zone, of the image of the objects with a recognition region, which is corresponding to the blind zone, of the image of the virtual image in a case where it is determined that the blind zone exists.

For example, in at least one example of the image recognition method, determining of whether or not a blind zone exists comprises: performing image recognition with respect to objects in the image of the objects and virtual objects, which is corresponding to the objects in the image of the objects, in the image of the virtual image, respectively; determining that the blind zone does not exist in a case where the objects in the image of the objects are the same as the virtual objects, which is corresponding to the objects in the image of the objects, in the image of the virtual image; and determining that the blind zone exists in a case where the objects in the image of the objects are not same as the virtual objects, which is corresponding to the objects in the image of the objects, in the image of the virtual image At least one embodiment of the present disclosure provides an image recognition method based on the goods shelf provided by any one embodiment of the present disclosure, the image recognition method comprises: obtaining an image, which serves as an initial image, of the baseplate of the goods shelf that is empty; obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects; and replacing a recognition region, which is corresponding to a blind zone, of the image of the objects with a recognition region, which is corresponding to the blind zone, of the image of the virtual image.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2B illustrates another schematic diagram of a goods shelf provided by at least an embodiment of the present disclosure;

FIG. 3 illustrates an exemplary flow chart of an image recognition method based on a goods shelf provided by at least an embodiment of the present disclosure;

FIG. 4 illustrates an exemplary flow chart of step S103 provided by at least an embodiment of the present disclosure;

FIG. 5 is an exemplary schematic diagram of calculating of a blind zone provided by at least an embodiment of the present disclosure;

DETAILED DESCRIPTION

Figure 1:
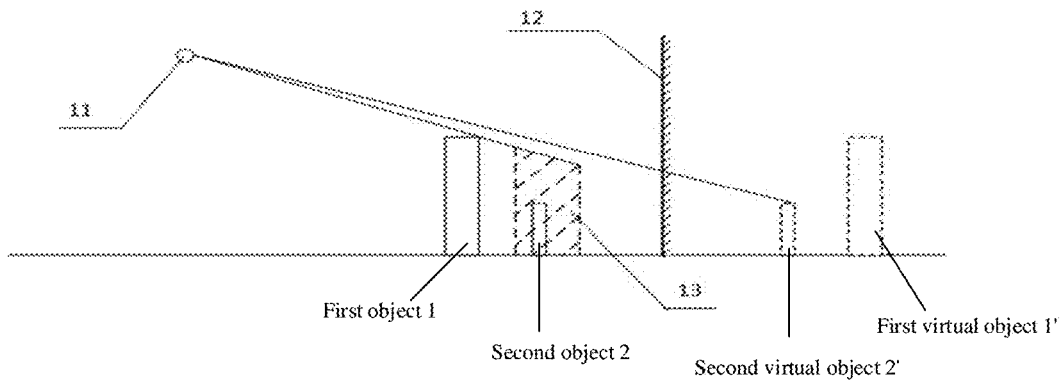
FIG. 1 illustrates a schematic diagram of an image acquisition device provided by at least an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors of the present disclosure have noted that, a blind zone may present when using a camera to perform image acquisition with respect to objects (commodities) on a goods shelf. For example, the blind zone is a region that cannot be presented in an image acquired by the camera. For example, the blind zone may be formed at an edge of the goods shelf because the commodity with a smaller height are sheltered or blocked by the commodity with a larger height, and the blind zone may cause adverse influence on the accuracy and/or precision in detecting the commodity shortage and the commodity misplacement.

At least one embodiment of the present disclosure provides an image acquisition device, a goods shelf, a monitoring device for a goods shelf, a monitoring method for a goods shelf and an image recognition method. The image acquisition device, the goods shelf, the monitoring device for the goods shelf, the monitoring method for the goods shelf, and the image recognition method can reduce a photograph blind zone.

At least one embodiment of the present disclosure provides an image acquisition device, which comprises: at least one reflective part which is configured to form a virtual image of an object through reflection of the object; and a camera which is configured to take a picture of the object and the virtual image of the object, so as to reduce a photograph blind zone.

FIG. 1 illustrates a schematic diagram of an image acquisition device provided by at least an embodiment of the present disclosure, and the image acquisition device may be provided on a goods shelf (the goods cabinet), so as to acquire an image of an object or objects (commodity or commodities) placed on the baseplate of the goods shelf (the goods cabinet). The objects (commodities) on the baseplate of the goods shelf (the goods cabinet) may comprise a plurality of kinds of objects (for example, a first object and a second object as illustrated in FIG. 1), and the lengths of the objects in the height direction of the goods shelf may respectively include a plurality of lengths.

As illustrated in FIG. 1, the image acquisition device comprises at least one reflective part 12 and a camera 11. The reflective part 12 is configured to generate the virtual image of the objects through reflection of the objects, and for example, the reflective part 12 is a part having a reflective structure such as a reflective surface; the camera 11 is configured to take a picture of the real image and the virtual image of the objects, so as to reduce or even eliminate a photograph blind zone 13.

It should be noted that, in some example, the real image of the objects represents the objects (real objects) that are placed on the goods shelf, the image of the real image of the objects means the image of the objects (the image of real objects); the virtual image of the object is formed through optical imaging of the reflective part 12 (that is, reflection of the reflective part 12); the image of the virtual image and the image of the real image of the objects (that is, the image of real objects) can be obtained through taking a picture of the virtual image of the objects and the objects by the camera 11 and dividing the picture which is taken by the camera 11 into the image of the objects and the image of the virtual image; the photograph blind zone 13 represents a region, which cannot be presented in an image acquired by the camera 11, of the goods shelf.

For example, the reflective part 12 is provided at a side of the object (the first object or the second object) away from the camera 11 in the horizontal direction (for example, the length direction of the goods shelf). For example, the image acquisition surface of the camera 11 faces toward the reflective surface of the reflective part 12.

In some examples, the image acquisition device does not comprise the reflective part 12, a blind zone may present when the camera performs image acquisition with respect to objects with different heights (that is, lengths in the height direction) or irregular objects. As illustrated in FIG. 1, in the case where the camera takes a picture of the first object and the second object and the height of the second object, which is provided at the side of the first object away from the camera, is smaller than the height of the first object, the second object is sheltered by the first object and thus the second object cannot be captured or only part of the second object is captured by the camera, that is, the second object cannot be presented in the image taken by the camera, or only part of the second object can be presented in the image taken by the camera, such that the blind zone 13 is formed.

In some examples of the present disclosure, by adopting the image acquisition device equipped with both of the reflective part and the camera, the image (or image region) of a sheltered portion (a sheltered region) can be obtained through a virtual image formed by the reflective part. For example, the image (or image region) of the second object in the blind zone 13 can be obtained through the virtual image, which is formed by the reflective part, of the second object. It should be noted that, a plurality of reflective parts may be provided in the image acquisition device according to specific implementations.

In some examples of the present disclosure, the reflective part 12 is a plane mirror. In the case where the reflective part is a plane mirror, the camera can capture the virtual image of the second object, and the virtual image of the second object is formed by the reflection of the light which is originated from the second object and incident on the plane mirror. Even though the images, acquired by the camera, of the virtual image and the real image of the second object (the image of the virtual image and the image of the second object) are different (or not exactly the same), the image recognition with respect to the objects is not adversely affected. For example, by adopting image processing methods such as deep learning (through artificial neural network, for example), the objects can be recognized with any one of the images being taken at different positions with respect to the objects.

In some examples of the present disclosure, the plane mirror is perpendicular to the plane where the object is placed (for example, the baseplate of the goods shelf). In this case, the virtual image formed by the plane mirror indicates the features of the objects without distortions, in this case, the recognition difficulty of the image of the virtual image (the image obtained through taking a picture of the virtual image) can be, for example, decreased. In some examples of the present disclosure, the angle between the plane mirror and the plane where the object is placed also may be greater than 90 degrees or smaller than 90 degrees. In the case where the angle between the plane mirror and the plane where the object is placed is greater than 90 degrees or is smaller than 90 degrees, even though part of features of the objects may be lost, but adverse influence on the recognition is minor. Therefore, the technical solution that the plane mirror is not perpendicular to the plane where the object is placed may be adopted according to the characteristics of the objects to be captured if the technical solution that the plane mirror is perpendicular to the plane where the object is placed cannot be adopted.

It should be noted that, the reflective part 12 is not limited to be the plane mirror; according to actual requirements in specific implementations, the reflective part 12 also may be a curved mirror or a special-shaped mirror. For example, the reflective part 12 may be a convex mirror, so as to enlarge the image acquisition region of the camera 11.

At least one embodiment of the present disclosure provides a goods shelf, which comprises a goods cabinet and an image acquisition device provided by any embodiment of the present disclosure. The goods cabinet comprises a baseplate; the baseplate is divided into a plurality of recognition regions, the plurality of recognition regions are respectively configured to support and contain (or accommodate) a plurality of kinds of objects; the camera of the image acquisition device is at a side of the plurality of kinds of objects away from the baseplate; and at least one reflective part of the image acquisition device is at at least one side of the plurality of kinds of objects in a direction along which the plurality of recognition regions are arranged in parallel.

Figure 2A:
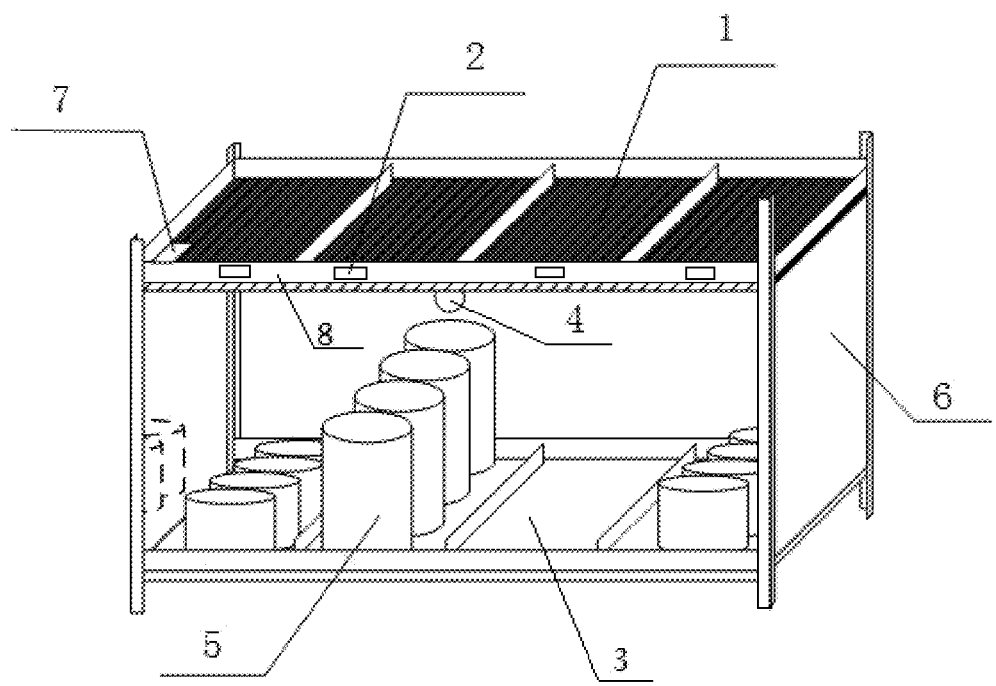
FIG. 2A illustrates a schematic diagram of a goods shelf provided by at least an embodiment of the present disclosure.

FIG. 2A illustrates a schematic diagram of a goods shelf provided by at least an embodiment of the present disclosure. FIG. 2B illustrates another schematic diagram of a goods shelf provided by at least an embodiment of the present disclosure. The goods shelf comprises a goods cabinet (not labelled with a character numeral in related figures) and the image acquisition device provided by any embodiment of the present disclosure.

As illustrated in FIG. 2A and FIG. 2B, the goods cabinet comprises a frame 101, a roof-plate 1, a side-plate 6, a back plate 102, and a baseplate 3, and the above-mentioned roof-plate 1, the side-plate 6, the back plate 102 and the baseplate 3 are respectively fixed to (for example, detachably fixed to) the frame 101.

As illustrated in FIG. 2A and FIG. 2B, the baseplate 3 is configured to support the objects (the commodities) placed thereon. For example, in the case where the goods cabinet is configured to support the objects (the commodities) in layers, the roof-plate 1 may also be served as the baseplate, in another layer, of the goods cabinet.

As illustrated in FIG. 2A and FIG. 2B, the baseplate 3 may be divided into a plurality of recognition regions (or the commodity regions), and the plurality of recognition regions are respectively configured to support the plurality of kinds of objects (commodities). For example, the plurality of recognition regions comprises a first recognition region 31, a second recognition region 32, a third recognition region 33, and a fourth recognition region 34. For example, the plurality of kinds of objects comprises a first object 51, a second object 52, a third object (not illustrated in figures), and a fourth object 54. For example, the plurality of kinds of objects have a plurality of different heights (that is, lengths in the height direction), respectively.

As illustrated in FIG. 2A and FIG. 2B, the goods cabinet comprises a length direction (i.e., a first direction D1), a height direction (i.e., a third direction D3) and a width direction (i.e., a second direction D2). For example, the first direction D1, the second direction D2 and the third direction D3 are intersected with each other (for example, are perpendicular to each other).

As illustrated in FIG. 2A and FIG. 2B, the side-plate 6 is provided at at least one side (for example, two sides) of the plurality of recognition regions in the first direction D1; and the back plate 102 is provided at at least one side (for example, one side) of the plurality of recognition regions in the second direction D2.

In an example, as illustrated in FIG. 2A and FIG. 2B, the plurality of recognition regions 3 are arranged in parallel along the first direction D1; in this case, at least one reflective part 12 of the image acquisition device comprises a first reflective part 121, and the first reflective part 121 is provided at one side of the plurality of kinds of objects 5 in the first direction D1.

In another example, the plurality of recognition regions 3 are arranged in parallel along the second direction D2; in this case, at least one reflective part 12 of the image acquisition device comprises a first reflective part, and the first reflective part is provided at one side of the plurality of kinds of objects 5 in the second direction D2.

In further another example, the plurality of recognition regions 3 are arranged in parallel along the first direction D1, and are further arranged in parallel along the second direction D2 intersecting the first direction D1 (i.e., the plurality of recognition regions 3 are arranged in an array); in this case, at least one reflective part 12 of the image acquisition device comprises a first reflective part and a second reflective part 122 (not illustrated in figures), and the first reflective part is at one side of the plurality of kinds of objects 5 in the first direction D1, and the second reflective part 122 is at another side of the plurality of kinds of objects 5 in the second direction D2.

In an example, as illustrated in FIG. 2A and FIG. 2B, the camera of the image acquisition device 4 is on the roof-plate 1 (for example, the surface of the roof-plate 1 closer to the baseplate). In some examples of the present disclosure, the camera is at the centerline, which extends along the width direction of the goods shelf, of the roof-plate, that is, the camera may be provided on the centerline (for example, the center of the roof-plate), which extends along the second direction, of the roof-plate. As illustrated in FIG. 2A and FIG. 2B, in the case where the camera is provided on the centerline of the roof-plate, the acquisition angle, with respect to the objects on the goods shelf, of the camera is relatively large, and therefore, the difficulty in subsequent image recognition can be reduced.

In an example, as illustrated in FIG. 2A and FIG. 2B, at least one reflective part 12 of the image acquisition device is at the side-plate 6 (for example, the surface of the side-plate 6 closer to the recognition regions 3); in this case, the reflective surface of the reflective part 12 faces toward the recognition regions 3, and the plurality of recognition regions are arranged in parallel along the first direction or arranged in an array.

In an example, at least one reflective part also may be provided at the back plate 102 (for example, the surface of the back plate 102 closer to the recognition regions 3); in this case, the reflective surface of the reflective part 12 faces toward the recognition regions 3, and the plurality of recognition regions are arranged in parallel along the second direction or arranged in an array. For example, in the case where the baseplate is divided into the plurality of recognition regions along the width direction of the baseplate (the goods cabinet), the at least one reflective part may be provided on the back plate.

It should be noted that, according to specific implementation, the goods cabinet also may not be provided with the back plate and the side-plate, in this case, the reflective part 12 may be provided at at least one of the positions where the back plate and the side-plate are located, as illustrated in FIG. 2A and FIG. 2B.

For example, as illustrated in FIG. 2A and FIG. 2B, the goods shelf may further comprise a division plate 103 (for example, a plurality of division plates 103), and each of the division plates 103 is provided at a spacing between adjacent recognition regions 103.

For example, as illustrated in FIG. 2A and FIG. 2B, the goods shelf further comprises a front baffle stripe 8, and the front baffle stripe 8 may be at a side of the roof-plate 1 (for example, the side of the roof-plate 1 closer to a moving passage for consumers). Labels 2 are placed on the front baffle stripe, such that different objects can be recognized by a user. In the case where the objects are commodities for selling, the labels each may comprise information such as name, place of production, and period of validity of the commodities for selling. In the case where the objects are samples for experiments, the labels comprise information such as names, storage time, and origin of the samples for experiment. For example, an edge of the roof-plate 1 may be provided with the labels 2.

For example, the position of the camera and the position and the number of the reflective part(s) may be set according to specific implementations when acquiring the image of the objects on the goods shelf with the image acquisition device provided by the embodiments of the present disclosure. Specifically, as illustrated in related figures, the camera may be on the roof-plate (e.g., attached to the roof-plate), and the reflective part may be on the side-plates at both sides of the goods shelf. In order to recognize different objects with better effect, the baseplate is divided into the plurality of recognition regions, each recognition region is configured for holding the same kind of objects, and different recognition region are configured for holding different kinds of objects. Even though FIG. 1 only illustrates the technical solution that the baseplate is divided into the plurality of recognition regions arranged in parallel along the length direction (the first direction D1) of the baseplate (the goods cabinet), the technical solution that the baseplate is divided into the plurality of recognition regions arranged in parallel along the width direction (the second direction D2) of the baseplate (the goods cabinet) may also be adopted.

For example, by introducing the reflective part, the blind zone problems that is presented in the image acquisition of the camera, especially edge type blind zone (for example, the blind zone at the edge of the goods shelf) can be addressed.

At least one embodiment of the present disclosure provides a monitoring device for a goods shelf, which comprises: a processor and a memory. Computer program instructions that are suitable to be executed by the processor of a computer are stored in the memory; upon the processor running (executing) the computer program instructions, the monitoring device for the goods shelf performs a method comprising: obtaining a determination result regarding whether or not an image of objects (image of real objects) on the goods shelf comprises an occlusion area; obtaining the image of the objects and an image of a virtual image of the objects (virtual image of the real objects) and performing image recognition based on the image of the objects and an image region, which is corresponding to the occlusion area, of the image of the virtual image in a case where the determination result is that the image of the objects comprises the occlusion area; and obtaining the image of the objects and performing image recognition based on the image of the objects in the case where the determination result is that the image of the objects does not comprise the occlusion area.

Non-limitative descriptions are given to the monitoring device for the goods shelf provided by at least an embodiment of the present disclosure in the following with reference to a plurality of examples. As described in the following, in case of no conflict, different features in these specific examples may be combined so as to obtain new examples, and the new examples are also fall within the scope of present disclosure.

Figure 7:
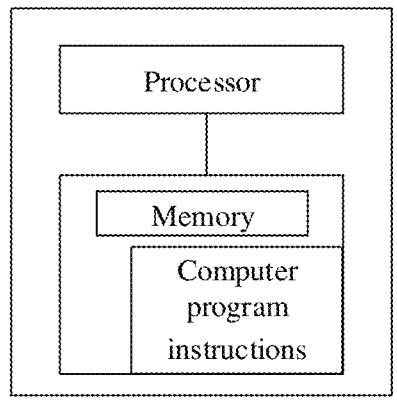
FIG. 7 illustrates an exemplary block diagram of a monitoring device for a goods shelf provided by at least an embodiment of the present disclosure.

FIG. 7 illustrates an exemplary block diagram of a monitoring device for a goods shelf provided by at least an embodiment of the present disclosure. As illustrated in FIG. 7, the monitoring device for the goods shelf comprises a processor and a memory. Computer program instructions that are suitable to be executed by the processor are stored in the memory; upon the processor running the computer program instructions, the monitoring device for the goods shelf performs the following step S310 and step S320.

Step S310: obtaining a determination result regarding whether or not an image of objects on the goods shelf comprises an occlusion area.

Step S320: obtaining the image of the objects and an image of a virtual image of the objects and performing image recognition based on the image of the objects and an image region, which is corresponding to the occlusion area, of the image of the virtual image in a case where the determination result is that the image of the objects comprises the occlusion area; and obtaining the image of the objects and performing image recognition based on the image of the objects in the case where the determination result is that the image of the objects does not comprise the occlusion area.

In some examples, by performing image recognition based on the image of the objects and the image region, which is corresponding to the occlusion area, of the image of the virtual image in the case where the determination result is that the image of the objects comprises the occlusion area, information of the object in the occlusion area can be obtained, such that the accuracy of the result of the image recognition and the monitoring effect of the monitoring device for the goods shelf can be improved.

For example, upon the processor running the computer program instructions, the monitoring device for the goods shelf performs the following step S330.

Step S330: determining whether or not at least one of a group consisting of commodity shortage and commodity misplacement exists based on a result of the image recognition; and uploading at least one of a group consisting of information related to the commodity shortage and information related to the commodity misplacement to a server in a case where it is determined that the at least one of the group consisting of the commodity shortage and the commodity misplacement exists.

For example, the commodity shortage means that the number of the commodity or commodities of a specific kind on the goods shelf is smaller than the stock reminding threshold of the commodity of the specific kind. For example, the stock reminding threshold may be set based on the average replenishment time of the specific kind of commodity (i.e., average time from placing an order with a wholesaler until having the specific kind of commodity to be shipped to the goods shelf), average on-shelf time of the specific kind of commodity (i.e., the average value of the time between placing the commodity on the goods shelf and successfully selling out the commodity), and quality guarantee period of the specific kind of commodity. For example, in the case where the average replenishment time is relatively short, the average on-shelf time is relatively long, and the quality guarantee period is relatively short, the stock reminding threshold may be set to be a relatively small value (for example, 1 or 2). For example, in the case where the average replenishment time is relatively long, the average on-shelf time is relatively short, and the quality guarantee period is relatively long, the stock reminding threshold may be set to be a relatively large value (for example, 5). For example, because the number of the third commodity (i.e., third object) as illustrated in FIG. 2B is equal to zero, it may be determined that the commodity shortage exists (shortage of the third commodity exists).

For example, the commodity misplacement means that one of the recognition regions is placed with a commodity that does not belong to this recognition regions. For example, in the case where the fourth commodity (i.e., fourth object) or a commodity that does not belong to the first commodity (i.e., first object) is within the first recognition region 101, it can be determined that the commodity misplacement exists (the commodity misplacement exists in the first recognition region 101).

For example, the server may be a general purpose server or a special purpose server and may be a virtual server, a cloud server, etc.

For example, at least one of a group consisting of information related to the commodity shortage and information related to the commodity misplacement may be uploaded (sent) to a server through a communication device.

For example, the communication device may send at least one of the information related to the commodity shortage and the information related to the commodity misplacement to the server through a network technology or other technologies. For example, the network may be the Internet, wireless local area network (WLAN), mobile communication network and the like; for example, the other technologies can include Bluetooth communication technology, infrared communication technology, etc. For example, the communication device may comprise a modem, a network adapter, a Bluetooth transmitter and receiver, or an infrared transmitter and receiver, etc. For example, the communication device may also perform operations such as coding and decoding of the sent information or the received information.

For example, performing of the image recognition based on the image of the objects and the image region, which is corresponding to the occlusion area, of the image of the virtual image comprises the step 321 and the step 322.

Step 321: replacing the occlusion area with the image region, which is corresponding to the occlusion area, of the image of the virtual image, so as to obtain a processed image; and Step 321: performing the image recognition based on the processed image.

For example, before replacing the occlusion area with the image region, which is corresponding to the occlusion area, of the image of the virtual image, a mirror symmetry operation may be performed with respect to the image region, which is corresponding to the occlusion area, of the image of the virtual image, and then the occlusion area in the image of the objects is replaced with the image region processed with the mirror symmetry operation, such that the difficulty of subsequent image recognition processes may be decreased.

For example, upon the processor running the computer program instructions, the monitoring device for the goods shelf performs the following step S340.

Step S340: obtaining the image of the objects and the image of the virtual image based on a picture which is taken by a camera of an image acquisition device of the goods shelf.

For example, the specific method regarding obtaining the image of the objects and the image of the virtual image based on the picture which is taken by the camera of the image acquisition device of the goods shelf may be set according to specific implementation, and no specific limitation will be given in the embodiments of the present disclosure.

In an example, the picture which is taken by the camera may be divided into the image of the objects and the image of the virtual image through using the division plates of the goods shelf as a reference. For example, for the example as illustrated in FIG. 2A and FIG. 2B, the goods shelf comprises three division plates, and the picture which is taken by the camera comprises six division plates (for example, arranged in parallel along the first direction D1), the picture which is taken by the camera is divided into the image of the objects and the image of the virtual image along the spacing between the commodities between two division plates at the center of the six division plate.

In another example, the picture which is taken by the camera may be divided according to a pre-stored dividing result of a reference image, and the dividing result of the reference image may be obtained through the following steps. Firstly, a reference image (for example, an initial image) may be obtained through taking a picture of the goods shelf that is not placed with the commodities by the camera; secondly, performing pre-dividing with respect to the reference image, so as to obtain an object region and a virtual image region. For example, the pre-dividing may be realized through manual dividing or automatic dividing using the division plates as references; and the dividing result of the reference image is stored.

For example, upon the processor running the computer program instructions, the monitoring device for the goods shelf performs the following step S350.

Step S350: dividing the image of the objects into a plurality of first image regions; and dividing the image of the virtual image into a plurality of second image regions.

For example, the plurality of first image regions are respectively corresponding to a plurality of recognition regions of a baseplate of the goods shelf; and the plurality of second image regions are respectively corresponding to the plurality of recognition regions of the baseplate of the goods shelf. For example, the plurality of first image regions and the plurality of recognition regions have a one-to-one correspondence therebetween; and the plurality of second image regions and the plurality of recognition regions have a one-to-one correspondence therebetween.

For example, dividing of the image of the objects into the plurality of first image regions and dividing of the image of the virtual image into the plurality of second image regions are in favor of replacing the occlusion area with the image region, which is corresponding to the occlusion area, of the image of the virtual image, and also is favorable to subsequent detection of at least one of the commodity misplacement and the commodity shortage.

For example, specific method of dividing the image of the objects into the plurality of first image regions and dividing the image of the virtual image into the plurality of second image regions may be set according to specific implementation, and no specific limitation will be given in the embodiments of the present disclosure. For example, the dividing method based on a reference object (for example, using the division plate of the goods shelf as a reference) or the pre-dividing method (for example, the image is divided through using the dividing result of the reference image) that are described in step S340 may be adopted.

For example, upon the processor running the computer program instructions, the monitoring device for the goods shelf performs the following step S360.

Step S360: obtaining the occlusion area of the image of the objects.

For example, specific method regarding obtaining the occlusion area of the image of the objects may be set according to specific implementation, and no specific limitation will be given in the embodiments of the present disclosure.

In an example, the occlusion area may be obtained through comparing the image of the objects and the image of the virtual image. For example, the object number reduction area (i.e., the area in which the number of objects is reduced) of the image of the objects is taken as the occlusion area; here, the number of the objects in the object number reduction area is smaller than the number of the virtual objects in the image region, which is corresponding to the object number reduction area, of the image of the virtual image. For example, the number of the objects in each of the first image region and the number of the virtual objects in each of the second image region may be obtained, and then the numbers of the objects (or virtual objects) in the first image region and the second image region that are corresponding to same one recognition region are compared to determine whether or not the first image region which is corresponding to the same recognition region is an object number reduction area, and all the first image region which is determined as the object number reduction area may be taken as the occlusion area of the image of the objects.

In another example, the occlusion area of the image of objects may be obtained based on the lengths of the objects along the height direction of the goods shelf, the height of the camera of the image acquisition device of the goods shelf (that is, the distance between the camera and the base plate of the goods shelf) and the distance between adjacent objects in the direction along which the recognition regions are arranged in parallel. For example, the occlusion area of the image of the objects may be obtained based on calculation of similar triangles with the above-mentioned parameters. For example, the method of obtaining the occlusion area of the image of the objects based on calculation of similar triangles may refer to the example as illustrated in FIG. 5, and no further descriptions will be given here.

In further another example, in the case where information that the height of the commodities in the outmost recognition region of the plurality of recognition regions is relatively small can be known in advance, the image region, which is corresponding to the outmost recognition region of the plurality of recognition regions, of the image of the objects may be directly taken as the occlusion area.

In further another example, the goods shelf may be provided with sensors (for example, weight sensors on the baseplate) that are configured to detect the number of the commodities (objects). For each of the recognition regions, in the case where the number, which is obtained based on the picture which is taken by the camera, of the commodities is smaller than the number, which is obtained by the sensors, of the commodities, it can be determined that the image region, which is corresponding to the recognition region, of the image of the objects is the occlusion area.

For example, the monitoring device for the goods shelf may be provided on the goods shelf. For another example, the monitoring device for the goods shelf may also be implemented as a server. For example, signals and/or instructions may be transmitted between the monitoring device for the goods shelf and the image acquisition device through a wired way or a wireless way. For example, wireless signal transmission may be realized through a network technology or other technologies, and the network technology or the other technologies may refer to the above-mentioned descriptions, and no further descriptions will be given here.

The processor, for example, is a central processing unit (CPU) or a processing unit in other forms having data processing capability and/or instruction execution capability. For example, the processor may be implemented as a general-purpose processor (GPP) and may also be a microcontroller, a microprocessor, a digital signal processor (DSP), a special-purpose image processing chip, a field programmable logic array (FPLA), and the like. The memory, for example, may include a volatile memory and/or a non-volatile memory, for example, may include a read-only memory (ROM), a hard disk, a flash memory, and the like. Correspondingly, the memory may be implemented as one or more computer program products. The computer program products may include computer readable storage media in various forms. One or more computer program instructions may be stored in the computer readable storage medium. The processor may run the program instructions to realize the function of the control device in the embodiment of the present disclosure as described below and/or other desired functions. The memory may also store various other application programs and various data, for example, the determination result regarding whether or not an occlusion area exists in the image of the objects on the goods shelf, the image of the objects and the image of the virtual image.

For example, in the case where the step S340, the step S350 and the step S360 are included, the step S340, the step S350 and the step S360 may be executed before executing of the step S310. For example, the step S330 may be executed after the step S320 is executed.

At least one embodiment of the present disclosure provides a monitoring method for a goods shelf, which comprises: obtaining a determination result regarding whether or not an image of objects on the goods shelf comprises an occlusion area; obtaining the image of the objects and an image of a virtual image of the objects and performing image recognition based on the image of the objects and an image region, which is corresponding to the occlusion area, of the image of the virtual image in a case where the determination result is that the image of the objects comprises the occlusion area; and obtaining the image of the objects and performing image recognition based on the image of the objects in the case where the determination result is that the image of the objects does not comprise the occlusion area. For example, specific implementations of the monitoring method for the goods shelf may refer to the monitoring device for the goods shelf, and no further descriptions will be given here.

For example, the monitoring device for the goods shelf and the monitoring method for the goods shelf can improve the accuracy in detecting at least one of the commodity misplacement and the commodity shortage through reducing the photograph blind zone.

FIG. 3 illustrates an exemplary flow chart of an image recognition method based on a goods shelf, provided by at least an embodiment of the present disclosure. For example, the image recognition method based on the goods shelf can increase the accuracy in detecting at least one of the commodity misplacement and the commodity shortage through reducing the photograph blind zone. As illustrated in FIG. 3, the image recognition method based on the goods shelf comprises the following step S101-step S103.

Step S101: obtaining an image (for example, the image is obtained through taking a picture), which serves as an initial image (for example, a reference image), of the baseplate of the goods shelf that is empty (that is, the goods shelf that is still not placed with any commodities).

Step S102: obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects (for example, an image of real image).

Step S103: determining whether or not a blind zone that is sheltered exists according to the image of the virtual image and the image of the objects (for example, the image of real image), and replacing a recognition region, which is corresponding to the blind zone, of the image of the objects with a recognition region, which is corresponding to the blind zone, of the image of the virtual image in a case where it is determined that the blind zone exists.

For example, the above-mentioned image recognition method based on the goods shelf may be realized through the following steps. Firstly, obtaining (for example, the image is obtained through taking a picture) an image, which serves as an initial image, of the baseplate of the goods shelf that is empty. Secondly, obtaining an image, which serves as a recognition image and is obtained through taking a picture of the baseplate of the goods shelf that is placed with the objects (taking a picture of the objects on the baseplate and a virtual image of the objects after the objects are placed on the baseplate); in this case, the recognition image comprises the virtual image, which is formed by reflection of the reflective part, of the object. Thirdly, comparing the features of the recognition image and the initial image, such that an image of the virtual image can be recognized (such that an image of the virtual image and an image of the objects can be obtained). Finally, determining whether or not a blind zone exists according to the image of the virtual image and the image of the objects (for example, the image of real image), and replacing the recognition region corresponding to the blind zone with the recognition region, which is corresponding to the blind zone, of the image of the virtual image, so as to improve the accuracy of recognizing the objects.

FIG. 4 illustrates an exemplary flow chart of the step S103 provided by at least an embodiment of the present disclosure. As illustrated in FIG. 4, determination method regarding whether or not a blind zone exists comprises the following step S111-step S112.

Step S111: performing image recognition with respect to objects in the image of the objects and virtual objects (virtual images of the objects), which is corresponding to the objects in the image of the objects, in the image of the virtual image, respectively; and determining that the blind zone does not exist in a case where the objects in the image of the objects are the same as the virtual objects, which is corresponding to the objects in the image of the objects, in the image of the virtual image.

Step S112: determining that the blind zone exists in a case where the objects in the image of the objects are not same as the virtual objects, which is corresponding to the objects in the image of the objects, in the image of the virtual image.

As illustrated in FIG. 1, the camera cannot take a picture of the second object (for example, the real image of the second object), but can take a picture of the first object and the second virtual image 2' (the virtual object of the second virtual image 2') of the second object 2. In this case, because the object in the recognition region in which the second object is located is different from the virtual object in the recognition region in which the object of the second virtual image 2' is located, it is determined that the recognition region in which the second object is located is the blind zone. In the case where the object in the image of the objects (for example, the image of real image) and the corresponding virtual object in the image of the virtual image are the same, it is determined that no blind zone exists. It should be noted that, when determining whether or not the object in the image of the objects (for example, the image of real image) and the virtual object in the image of the virtual image are objects which are corresponding to each other, the recognition region serves as a basis of judgment, that is, after the recognition region, which is corresponding to the recognition region of the image of the objects (for example, the image of real image), of the image of the virtual image are determined, the object in the recognition region of the image of the objects (for example, the image of real image) and the virtual object in the recognition region of the image of the virtual image are respectively recognized.

FIG. 5 illustrates an exemplary schematic diagram of calculating of a blind zone provided by at least an embodiment of the present disclosure. Whether or not the photograph blind zone exists in the edge recognition region q2 close to the side-plate 6 can also be determined through the following equation 1.

$$h2 = \frac{d1-d2}{d1}H + \frac{d2}{d1}h1 \qquad \text{equation (1)}$$

Here, H is the height of the camera (that is, the distance between the camera and the baseplate); h1 is the height of the first object (that is, the length of the first object in the height direction) in the recognition region q1; h2 is the height of first intersection point (that is, the distance between the intersection point and the baseplate) of a first virtual line and a second virtual line, in which the first virtual line connects the camera 11 and the top of the first object, and the second virtual line passes through the second object and is parallel to the height direction (h1>h2); d1 is the distance, in the horizontal direction, between the first object and the orthographic projection of the camera on the baseplate; d2 is the distance, in the horizontal direction, between the second object and the orthographic projection of the camera on the baseplate; D is distance, in the horizontal direction, between the orthographic projection of the camera on the baseplate and a second intersection point of the first virtual line and the baseplate. The above-mentioned equation (1) is obtained based on similar triangle theory.

In the case where the height of the second object is smaller than h2, the photograph blind zone 13 is presented and the second object in the photograph blind zone 13 may not be recognized only based on the image of objects on the goods shelf.

At least an embodiment of the present disclosure further provides another image recognition method based on the goods shelf.

Figure 6:
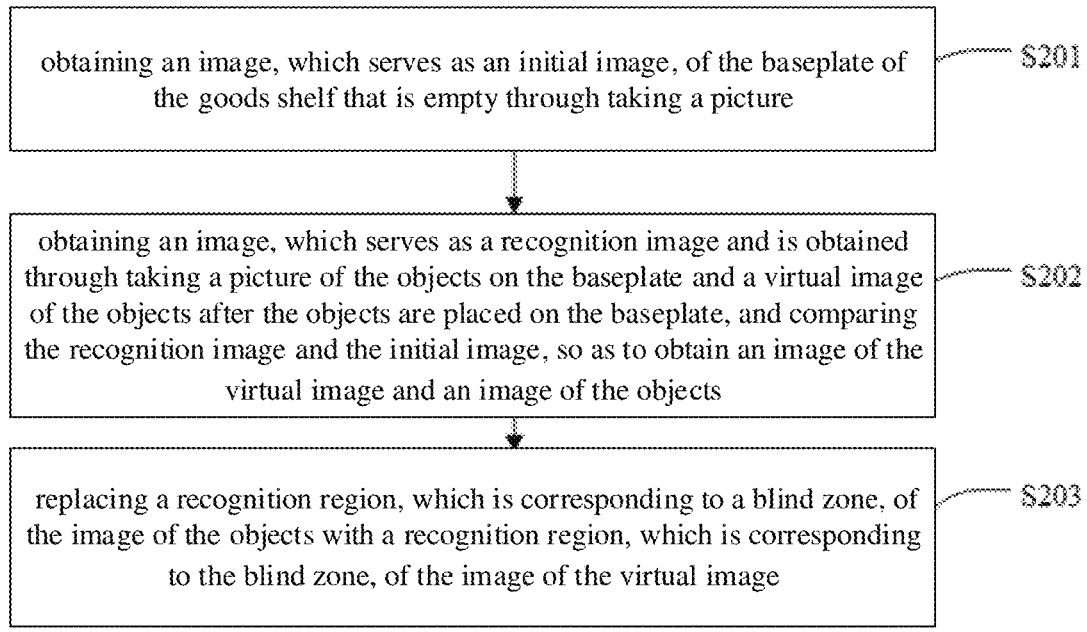
FIG. 6 illustrates another exemplary flow chart of an image recognition method based on a goods shelf provided by at least an embodiment of the present disclosure.

FIG. 6 illustrates another exemplary flow chart of the image recognition method for the goods shelf provided by at least an embodiment of the present disclosure. As illustrated in related figures, the image recognition method comprises the following step S201-step S203.

Step S201: obtaining an image (for example, the image is obtained through taking a picture), which serves as an initial image (for example, a reference image), of the baseplate of the goods shelf that is empty (that is, the goods shelf that is not placed with the commodities).

Step S202: obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects (for example, an image of real image).

Step S203: replacing a recognition region, which is corresponding to a blind zone, of the image of the objects (for example, the image of real image) with a recognition region, which is corresponding to the blind zone, of the image of the virtual image.

The difference between the image recognition method as illustrated in FIG. 6 and the image recognition method as illustrated in FIG. 3 is in the last step. The step S203 does not comprise determining of whether or not the blind zone exist, and the recognition region, which is corresponding to the blind zone, of the image of the objects (for example, the image of real image) is directly replaced with the recognition region, which is corresponding to the blind zone, of the image of the virtual image. For example, in the case where the recognition accuracy and/or precision of the formed virtual image is relatively high, replacing of the image of object (for example, the image of real image) with the image of the virtual image does not adversely affect the recognition of the objects.

The flowcharts and block diagrams in the accompanying drawings illustrate the possible architecture, functions and operations of systems, methods and computer program products provided by the embodiments of the present disclosure. In this regard, each block in a flowchart or block diagram may represent a module, program segment, or part of a code, and the above-mentioned module, program segment, or part of the code comprises one or more executable instructions for implementing a desired logical function. It should also be noted that, in some alternative implementations, the functions described by the contents in the boxes may also be executed in a different order from the order that is illustrated in the drawings. For example, two contiguous boxes may be executed in an essentially parallel mode in a specific implementation, and may also be executed in a reverse order, depending on the function involved. It should also be noted that each box in the block diagram and/or flow chart, and the combination of the boxes in the block diagram and/or flow chart may be implemented by a dedicated hardware-based system that performs desired functions or operations, or may be implemented by a combination of dedicated hardware and computer instructions.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. An image acquisition device, being within a goods shelf comprising a goods cabinet, wherein the goods cabinet comprises a baseplate, the baseplate is divided into a plurality of recognition regions, the plurality of recognition regions are respectively configured to support a plurality of kinds of objects, the image acquisition device, comprising:
   at least one reflective part which is at least one side of the plurality of kinds of objects in a direction along which the plurality of recognition regions are arranged in parallel and configured to form a virtual image of an object through reflection of the object; and
   a camera which is at a side of the plurality of kinds of objects away from the baseplate and configured to take a picture of the object and the virtual image of the object, so as to reduce a photograph blind zone.

2. The image acquisition device according to claim 1, wherein the reflective part is at a side of the object away from the camera; and the reflective part is a plane mirror.

3. The image acquisition device according to claim 2, wherein the plane mirror is perpendicular to a plane where the object is placed; or
   the angle between the plane mirror and the plane where the object is placed is greater than 90 degrees or smaller than 90 degrees.

4. A goods shelf, comprising a goods cabinet and an image acquisition device, wherein the image acquisition device comprises at least one reflective part and a camera;
   the at least one reflective part is configured to form a virtual image of an object through reflection of the object; and
   the camera is configured to take a picture of the object and the virtual image of the object, so as to reduce a photograph blind zone;
   the goods cabinet comprises a baseplate;

the baseplate is divided into a plurality of recognition regions, the plurality of recognition regions are respectively configured to support a plurality of kinds of objects;

the camera of the image acquisition device is at a side of the plurality of kinds of objects away from the baseplate; and the at least one reflective part of the image acquisition device is at at least one side of the plurality of kinds of objects in a direction along which the plurality of recognition regions are arranged in parallel.

5. The goods shelf according to claim 4, wherein the plurality of recognition regions are arranged in parallel along a first direction;

the at least one reflective part of the image acquisition device comprises a first reflective part, and the first reflective part is at one of the at least one side of the plurality of kinds of objects in the first direction;

the plurality of recognition regions is further arranged in parallel along a second direction which intersects the first direction; and the at least one reflective part of the image acquisition device further comprises a second reflective part, and the second reflective part is at another one of the at least one side of the plurality of kinds of objects in the second direction.

6. The goods shelf according to claim 4, wherein the goods cabinet further comprises a roof-plate and a side-plate;

the side-plate is at at least one side of the plurality of recognition regions in the first direction;

the plurality of recognition regions is arranged in parallel along a first direction;

the camera of the image acquisition device is on a surface of the roof-plate closer to the baseplate; and the at least one reflective part of the image acquisition device is on a surface of the side-plate closer to the plurality of recognition regions.

7. The goods shelf according to claim 6, wherein the camera is at a centerline, which extends along a second direction intersecting the first direction, of the roof-plate;

the goods cabinet of the goods shelf further comprises a back plate;

the back plate is at a side of the plurality of recognition regions in the second direction;

the plurality of recognition regions is further arranged in parallel along the second direction; and the at least one reflective part is further on a surface of the back plate closer to the plurality of recognition regions.

8. A monitoring method for a goods shelf, comprising:

obtaining a determination result regarding whether or not an image of objects on the goods shelf comprises an occlusion area;

obtaining the image of the objects and an image of a virtual image of the objects and performing image recognition based on the image of the objects and an image region, which is corresponding to the occlusion area, of the image of the virtual image in a case where the determination result is that the image of the objects comprises the occlusion area; and obtaining the image of the objects and performing image recognition based on the image of the objects in the case where the determination result is that the image of the objects does not comprise the occlusion area.

9. A monitoring device for a goods shelf, comprising: a processor and a memory, wherein computer program instructions that are suitable to be executed by the processor are stored in the memory; and upon the processor running the computer program instructions, the monitoring device for the goods shelf performs the monitoring method according to claim 8.

10. The monitoring device according to claim 9, wherein upon the processor running the computer program instructions, the monitoring device for the goods shelf further performs a following method comprising:

determining whether or not at least one of a group consisting of commodity shortage and commodity misplacement exists based on a result of the image recognition; and uploading at least one of a group consisting of information related to the commodity shortage and information related to the commodity misplacement to a server in a case where it is determined that the at least one of the group consisting of the commodity shortage and the commodity misplacement exists.

11. The monitoring device according to claim 9, wherein performing of the image recognition based on the image of the objects and the image region, which is corresponding to the occlusion area, of the image of the virtual image comprises:

replacing the occlusion area with the image region, which is corresponding to the occlusion area, of the image of the virtual image, so as to obtain a processed image; and performing the image recognition based on the processed image.

12. The monitoring device according to claim 9, wherein upon the processor running the computer program instructions, the monitoring device for the goods shelf further performs a following method comprising:

obtaining the occlusion area of the image of the objects.

13. The monitoring device according to claim 9, wherein the occlusion area is obtained through comparing the image of the objects and the image of the virtual image.

14. The monitoring device according to claim 13, wherein the occlusion area is an object number reduction area of the image of the objects; and a number of objects in the object number reduction area is smaller than a number of virtual objects in an image region, which is corresponding to the object number reduction area, of the image of the virtual image.

15. The monitoring device according to claim 12, wherein the occlusion area of the image of the objects is obtained based on lengths of the objects, a height of a camera of an image acquisition device of the goods shelf with respect to a plane where the objects are located, and a distance between adjacent objects; or the occlusion area comprises a recognition region at very outside of the plurality of recognition regions.

16. The monitoring device according to claim 9, wherein upon the processor running the computer program instructions, the monitoring device for the goods shelf further performs a following method comprising:

obtaining the image of the objects and the image of the virtual image based on a picture which is taken by a camera of an image acquisition device of the goods shelf.

17. The monitoring device according to claim 9, wherein upon the processor running the computer program instructions, the monitoring device for the goods shelf further performs a following method comprising:

dividing the image of the objects into a plurality of first image regions;

dividing the image of the virtual image into a plurality of second image regions, wherein the plurality of first image regions are respectively corresponding to a plurality of recognition regions of a baseplate of the goods shelf; and the plurality of second image regions are respectively corresponding to the plurality of recognition regions of the baseplate of the goods shelf.

18. An image recognition method based on the goods shelf according to claim 4, comprising:

obtaining an image, which serves as an initial image, of the baseplate of the goods shelf that is empty;

obtaining an image which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects; and determining whether or not a blind zone exists according to the image of the virtual image and the image of the objects, and replacing a recognition region, which is corresponding to the blind zone, of the image of the objects with a recognition region, which is corresponding to the blind zone, of the image of the virtual image in a case where it is determined that the blind zone exists.

19. The image recognition method according to claim 18, wherein determining of whether or not a blind zone exists comprises:

performing image recognition with respect to objects in the image of the objects and virtual objects, which is corresponding to the objects in the image of the objects, in the image of the virtual image, respectively;

determining that the blind zone does not exist in a case where the objects in the image of the objects are same as the virtual objects, which is corresponding to the objects in the image of the objects, in the image of the virtual image; and determining that the blind zone exists in a case where the objects in the image of the objects are not same as the virtual objects, which is corresponding to the objects in the image of the objects, in the image of the virtual image.

20. An image recognition method based on the goods shelf according to claim 4, comprising:

obtaining an image, which serves as an initial image, of the baseplate of the goods shelf that is empty;

obtaining an image, which serves as a recognition image and is obtained through taking a picture of the objects on the baseplate and a virtual image of the objects after the objects are placed on the baseplate, and comparing the recognition image and the initial image, so as to obtain an image of the virtual image and an image of the objects; and replacing a recognition region, which is corresponding to a blind zone, of the image of the objects with a recognition region, which is corresponding to the blind zone, of the image of the virtual image.

* * * * *